(12) United States Patent
Yamamoto

(10) Patent No.: US 6,224,309 B1
(45) Date of Patent: May 1, 2001

(54) STRUCTURAL BLIND FASTENER

(75) Inventor: Albert Kiyoshi Yamamoto, Huntington Beach, CA (US)

(73) Assignee: Fairchild Holding Corp., Dulles, VA (US)

( * ) Notice: Subject to any disclaimer, the term of this patent is extended or adjusted under 35 U.S.C. 154(b) by 0 days.

(21) Appl. No.: 09/542,465

(22) Filed: Apr. 4, 2000

Related U.S. Application Data

(60) Provisional application No. 60/128,286, filed on Apr. 8, 1999.

(51) Int. Cl.$^7$ .............................. F16B 13/04; F16B 13/06
(52) U.S. Cl. ................... 411/11; 411/34; 411/55; 411/183
(58) Field of Search ................. 411/10, 11, 12, 411/34–38, 55, 183

(56) References Cited

U.S. PATENT DOCUMENTS

| | | | |
|---|---|---|---|
| 2,409,352 | * 10/1946 | Gill | 411/38 |
| 2,850,937 | 9/1958 | Ralston. | |
| 2,914,106 | * 11/1959 | Boyd | 411/38 |
| 3,136,203 | * 6/1964 | Davis | 411/38 |
| 4,007,659 | 2/1977 | Stencel. | |
| 4,875,815 | * 10/1989 | Phillips, II | 411/55 |
| 5,498,110 | 3/1996 | Stencel et al. | 411/43 |
| 5,919,016 | * 7/1999 | Smith et al. | 411/34 |

\* cited by examiner

*Primary Examiner*—Neill Wilson
(74) *Attorney, Agent, or Firm*—Christie, Parker & Hale, LLP

(57) ABSTRACT

A blind fastener for compressively connecting at least two overlapping workpieces including a threaded core bolt and a pull-up nut at least partially positioned within an aperture of a hollow bolt. The nut includes a larger diameter portion and a smaller diameter portion. The hollow bolt is sized to be received within aligned apertures in the workpieces and includes an enlarged head portion and a body portion extending from the head portion. The core bolt and the smaller diameter portion of the nut are positioned in the aperture in the hollow bolt such that when the core bolt is rotated with respect to the nut the larger diameter portion of the nut disrupts the body portion of the hollow bolt and the smaller diameter portion of the nut fills the space between the core bolt and the disrupted body portion of the hollow bolt to increase the shear and tensile load capabilities of the fastener.

15 Claims, 1 Drawing Sheet

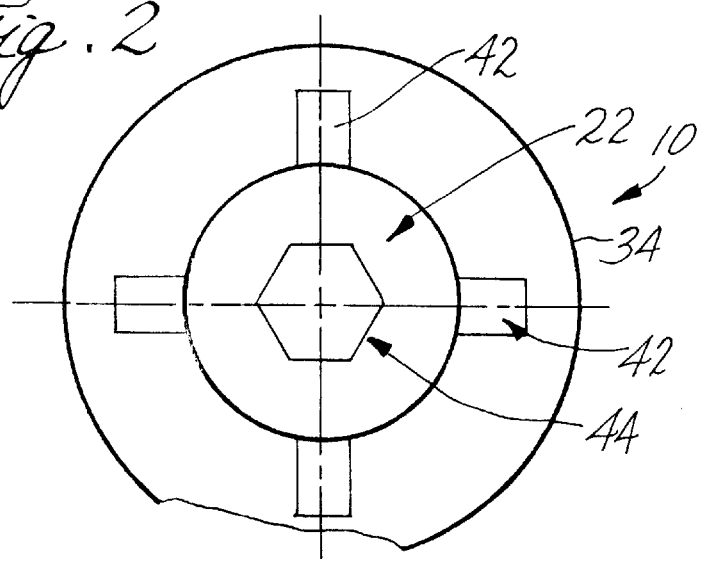
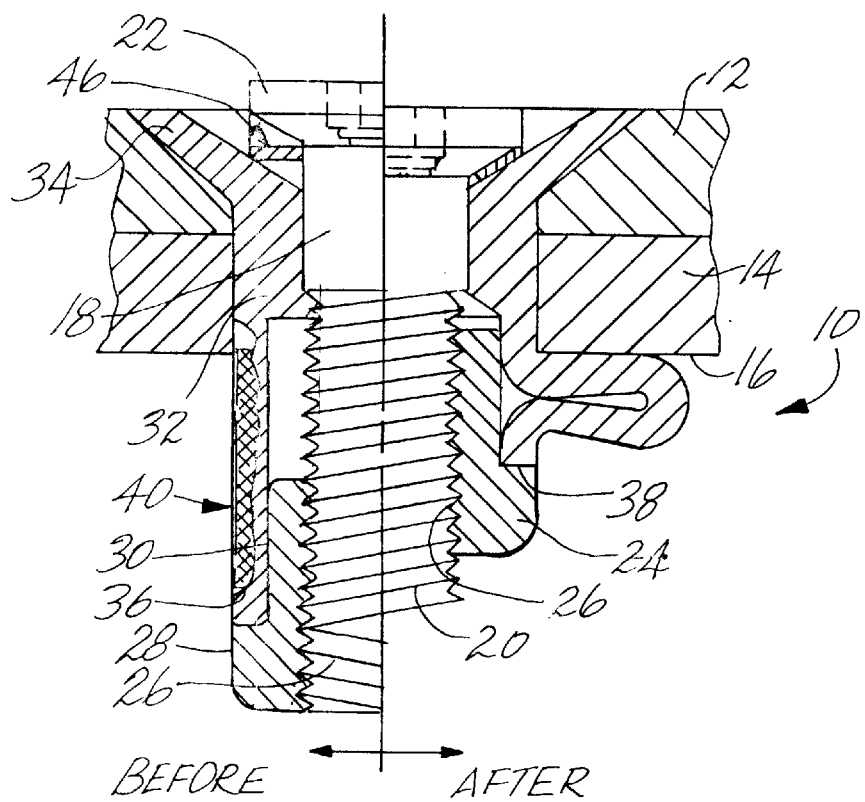

STRUCTURAL BLIND FASTENER

CROSS-REFERENCE TO RELATED APPLICATION(S)

This application claims priority from U.S. Provisional application No. 60/128,286 filed Apr. 8, 1999.

BACKGROUND OF THE INVENTION

This invention relates to blind fasteners for securing sheet material together and, in particular, to a blind fastener that during installation is transformed into a solid shank fastener capable of withstanding high shear and tensile loads.

Blind fasteners have become particularly useful in securing sheet materials where it is impossible to access the underside of the material. Typically such fasteners are inserted into an aperture through the material and include a threaded stem for engaging the fastener. Rotation of the stem draws an expansion member into engagement with the underside of the material. Expansion may be aided by a nut body which forces the expansion member radially outwardly to engage the underside. Upon complete expansion to fully clamp the sheet material, the exterior end of the threaded stem may be broken away to eliminate any protrusions from the exterior surface.

Such fasteners have wide application in aircraft and space vehicle assembly. However, the vibrations and sonic fatigue such vehicles are subject to causes loosening of the fasteners.

Another problem with previously available blind fasteners, such as blind rivets, is that when the expansion member is drawn against the workpiece, the deformation of the expansion member causes a gap to exist between the expansion member and the stem. This gap limits the shear and tensile load capability for the fastener. An attempt to eliminate the space between the stem and the expansion member was through the use of a blind fastener arrangement wherein the stem member had an enlarged head which when drawn up through the expansion member caused the expansion member to expand only to the size of the enlarged head on the stem. The problem with this arrangement is that the footprint or surface area of the expansion member which engaged the backside of the workpiece is limited. A limited footprint also contributed to its inability to withstand high shear and tensile loads.

Other problems with previously available blind fasteners is that they do not provide a mechanism to visually determine if the fastener was installed, fails to provide a flush surface after installation, or incorporate frangible or loose pieces which could result in damage to internal damage to components of the vehicle. Other problems with previously available blind fasteners is that they require installation through the use of an expensive installation tool.

Consequently, a need exists for an improved blind fastener arrangement which can withstand high shear and tensile loads and eliminates the problems associated with previously available blind fasteners.

SUMMARY OF THE INVENTION

The present invention is directed to a structural blind fastener capable of withstanding high shear and tensile loads which has been designed to overcome the disadvantages of previous blind fasteners. The blind fastener of the present invention includes an externally threaded core bolt which is positioned within a hollow bolt or sleeve body which is positioned within an aperture extending through two or more sheets of material to be fastened together. An internally threaded pull-up nut is positioned below the sleeve body and is threaded onto the core bolt. A portion of the pull-up nut has a smaller outside diameter so that the sleeve body partially overlaps the pull-up nut. A spring washer is positioned below the head of the core bolt and adjacent the sleeve body which provides a means of visually determining if the fastener is installed.

Following insertion of the fastener into the apertures in the overlapping sheet material the core bolt is rotated relative to the pull-up nut drawing the pull-up nut towards the head of the core bolt. As the pull-up nut is drawn towards the sleeve body, a portion of the sleeve body expands outwardly. The core bolt and pull-up nut continue to compress the sleeve body as it engages the interior surface of the sheet material. Further movement of the pull-up nut axially compresses and radially expands the sleeve body against the interior wall surrounding the aperture and the smaller diameter portion of the nut fills the gap between the core bold and the disrupted sleeve body thereby resulting in a solid shank fastener when installed. Simultaneously, the spring washer is compressed by the head of the core bolt against a head portion of the sleeve body providing a visual indication that the fastener has successfully been installed.

Other objects, features and advantages of the invention will be apparent from the following detailed description taken in connection with the accompanying drawings.

DESCRIPTION OF THE DRAWINGS

The present invention will be more fully understood by reference to the following detailed description of a preferred embodiment of the present invention.

FIG. 1 is a cross-sectional view of the blind fastener of the present invention illustrating the fastener before installation and after installation; and FIG. 2 is a top view of the fastener of FIG. 1.

DETAILED DESCRIPTION OF THE INVENTION

FIGS. 1 and 2 illustrate the structural blind fastener 10 of the present invention. The fastener 10 is utilized for securing materials such as overlapping sheets 12 and 14. Typically the sheets are made of materials commonly used in the aerospace industry including aluminum or other composite materials. The fastener 10 is designed to create a clamping force thereby holding sheets 12 and 14 together. The fastener 10 is particularly useful in the assembly of aircraft and space vehicles where access to an interior surface of sheet 14 is not possible. This application is typically known as a "blind" application.

The fastener 10 includes a core bolt 18 having external threads 20 positioned on one end of the core bolt opposite an enlarged head portion 22. A pull-up nut 24 having internal threads 26 sized to threadingly cooperate with core bolt threads 20 is positioned on the threaded end of the core bolt. The pull-up nut 24 has a larger outer diameter portion 28 and an adjacent smaller diameter portion 30.

The fastener 10 further includes a hollow bolt 32 also referred to herein as a sleeve body. The hollow bolt 32 includes a head portion 34 and a cylindrical body portion 36. The core bolt 18 and smaller outer diameter portion of pull-up nut 24 are positioned within the hollow interior of hollow bolt 32. Preferably the larger outer diameter portion of pull-up nut 24 is sized to be similar to the outer diameter of the body portion 36 of the hollow bolt so that an end surface of the body portion rests on a driving surface 38 of the larger outer diameter portion 28 of pull-up nut 24.

The cylindrical body portion 36 of the hollow bolt 32 includes a knurled portion 40 extending around the outer diameter of the body portion which assists the body portion to be disrupted as discussed in more detail below. The head portion 34 of hollow bolt 32 includes a number of installation slots 42 positioned around the circumference of the head which are engaged by a tool (not shown) during installation of the fastener to prevent rotation of the hollow bolt 32. The head 22 of the core bolt includes a recess 44 for the insertion of another installation tool (not shown) to rotate the core bolt during installation. The recess 44 is shown as an hexagonal recess for the receipt of an Allen key, however it is to be understood that other types of recesses could be positioned in the head 22 for receipt of other types of installation tools. For example, the recess could be a cross-slot for receipt of a Phillips screw driver, a spline socket for receipt of a splined driving tool, etc. The fastener can further include a spring washer 36 positioned below head 22 of core bolt and adjacent head portion 34 of hollow bolt 32. The spring washer 46 serves as a visual aid during installation to tell when the fastener has been installed. The spring washer holds the core bolt up prior to installation and during installation is pushed down when the core bolt is rotated with respect to the pull-up nut 24.

The fastener 10 of the present invention is installed by placing the hollow bolt 32 containing the core bolt 18 partially threaded onto the pull-up nut 24 into the aperture in sheets 12 and 14 as shown on the left hand side of FIG. 1. The core bolt is slightly raised above the head of the hollow bolt by spring washer 46. An installation tool having one or more engagement surfaces are placed within the installation slots 42 in the head of the hollow bolt to prevent the hollow bolt from rotating. A driving tool is then positioned within the recess 44 in the head 22 of the core bolt which rotates the core bolt with respect to pull-up nut 24. As the core bolt is rotated, the pull-up nut is drawn towards the head 22 of the core bolt thereby buckling the cylindrical body portion 36 as shown on the right hand side of FIG. 1. As the core bolt is rotated with respect to the pull-up nut the spring washer 46 is compressed so that when the fastener is installed the core bolt is flush with the hollow bolt. The disrupted portion of the hollow bolt compressively clamps sheets 12 and 14 together.

An advantage of the present invention is that the smaller diameter portion 30 of the pull-up nut fills the empty space between the disrupted portion of the hollow bolt and the threaded portion of the core bolt. Since this space is filled by the pull-up nut, the fastener is enabled to withstand higher shear and tensile loads placed on the fastener. In essence, the fastener by filling the void space is transformed into a solid shank fastener because the center of the fastener is filled by the core bolt and the pull-up nut. Since the pull-up nut is able to fill the void space, the disrupted portion of the hollow core bolt can be designed to be much larger than prior blind fasteners thereby providing a larger footprint and a more secure fastener. A larger footprint, i.e. the outer diameter created by the disrupted portion of the core bolt, results in a more secure blind fastener, and one capable of withstanding higher shear and tensile loads. Another advantage of the fastener of the present invention is that the grip range is significantly improved over previous blind fasteners. Because the thickness in sheet material for which the fastener is used ranges significantly from sheet to sheet, the disrupted portion of the fastener can accommodate larger differences in sheet thicknesses. The grip range for the fastener can accommodate a difference in thickness for sheets of up to 0.060 inches.

Another advantage of the fastener of the present invention is that because the footprint created by the disrupted portion of the hollow bolt is so large, the fastener can be used for sheet material having an inclined back surface for which the disrupted portion engages.

Although the present invention has been described and illustrated with respect to a preferred embodiment thereof, it is to be understood that changes and modifications can be made therein which are within the full intended scope of the invention as hereinafter claimed.

What is claimed is:

1. A fastener for compressively connecting at least two overlapping workpieces comprising:

a core bolt having an enlarged head and an externally threaded end opposite the head;

a nut having an internally threaded bore for threadable receipt of the threaded end of the core bolt;

the nut having a larger diameter portion and a smaller diameter portion;

a hollow bolt sized to be received within aligned apertures in the workpieces having an enlarged head portion, a body portion extending from the head portion, and an aperture extending axially through the head portion and the body portion; and a spring washer positioned between the head of the core bolt and the head portion of the hollow bolt, wherein the core bolt and the smaller diameter portion of the nut are positioned in the aperture in the hollow bolt such that when the core bolt is rotated with respect to the nut the larger diameter portion of the nut disrupts the body portion of the hollow bolt and the smaller diameter portion of the nut fills the space between the core bolt and the disrupted body portion of the hollow bolt to increase the shear and tensile load capabilities of the fastener.

2. The fastener of claim 1 wherein the body portion of the hollow bolt includes a knurled portion extending around the perimeter of the body portion.

3. The fastener of claim 1 wherein the head portion of the hollow bolt includes at least one installation slot to prevent rotation of the hollow bolt during installation of the fastener.

4. The fastener of claim 1 wherein the core bolt includes a recess in the head for use in rotating the core bolt.

5. The fastener of claim 1 wherein the nut has a driving surface on the larger diameter portion which engages an end surface of the body portion of the hollow bolt.

6. A blind fastener system comprising:

a first workpiece having an aperture;

a second workpiece having an aperture aligned with the aperture of the first workpiece;

a sleeve body sized to be positioned through the apertures of the workpiece and extend beyond the workpieces;

a threaded bolt passing through the sleeve body;

a nut threaded to the bolt having means to compress the sleeve body onto the workpieces as the bolt is rotated and means to fill an area between the bolt and the sleeve body as the sleeve body is compressed; and a spring washer positioned between the sleeve body and the threaded bolt.

7. The fastening system of claim 6 wherein the means to compress the sleeve body is a driving surface on the nut.

8. The fastening system of claim 7 wherein the means to fill an area between the bolt and the sleeve is a smaller diameter portion of the nut extending from the driving surface.

9. The fastening system of claim 6 wherein the sleeve body includes a knurled portion extending around the perimeter of the sleeve body.

10. The fastening system of claim 6 wherein the sleeve body includes a head portion having at least one installation slot to prevent rotation of the sleeve body during rotation of the threaded bolt.

11. A blind fastener comprising:

a hollow bolt;

a threaded core bolt positioned in the hollow bolt;

a pull-up nut threaded to the core bolt; and a spring washer positioned between the hollow bolt and the core bolt for indicating an installed status of the fastener.

12. The blind fastener of claim 11 wherein the hollow bolt is positioned through aligned apertures of at least two overlapping workpieces wherein during rotation of the core bolt the nut disrupts the hollow bolt against the workpieces and fills a gap between a disrupted portion of a hollow bolt and the core bolt.

13. The blind fastener of claim 11 wherein the hollow bolt includes a knurled portion extending around a perimeter of the hollow bolt.

14. The blind fastener of claim 11 wherein the hollow bolt includes an enlarged head portion having at least one installation slot to prevent rotation of the hollow bolt during installation of the blind fastener.

15. The blind fastener of claim 11 wherein the pull-up nut has a driving surface which engages an end surface of the hollow bolt.

* * * * *